Figure 1:
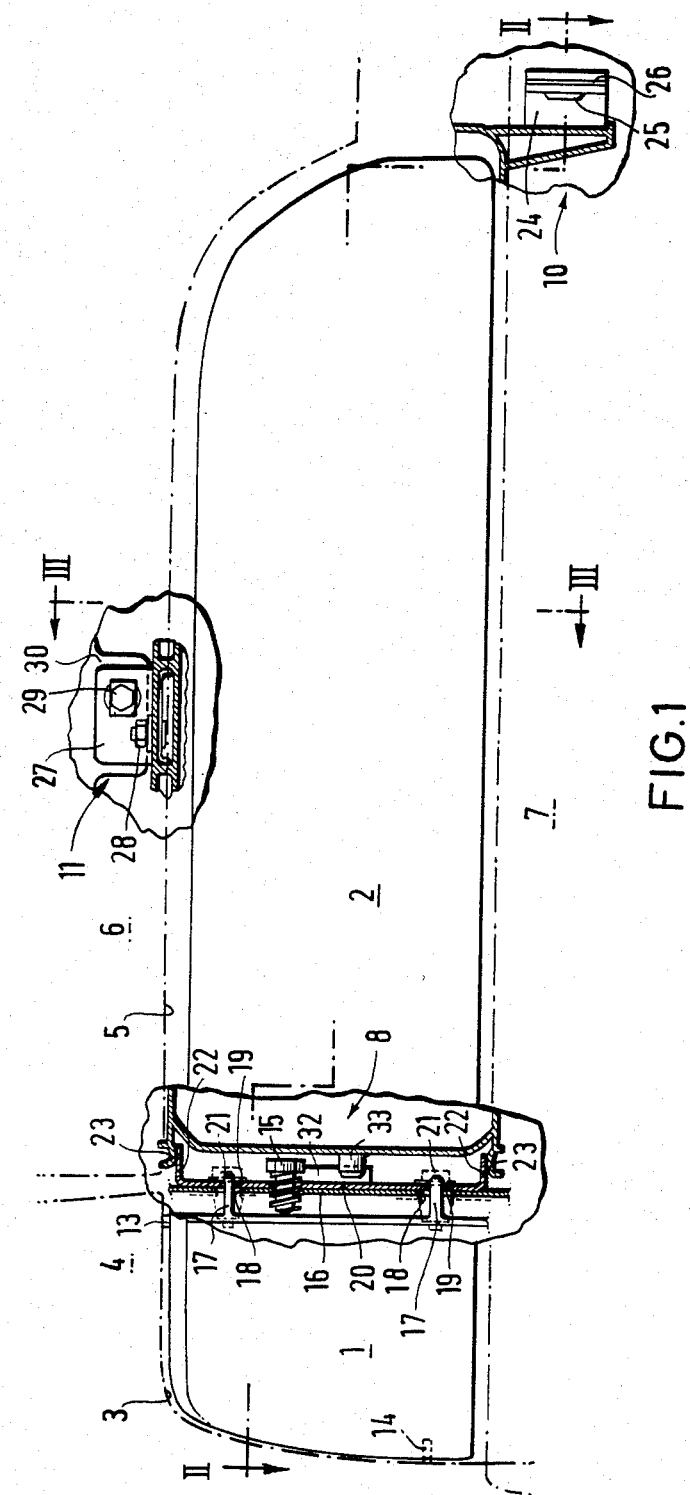

United States Patent [19]

Hawlitzki et al.

[11] Patent Number: 4,539,626
[45] Date of Patent: Sep. 3, 1985

[54] INDICATOR LAMP AND HEADLAMP MOUNTING TO VEHICLE BODYWORKS

[75] Inventors: Christian Hawlitzki, Pulheim; Heinz Dick, Odenthal, both of Fed. Rep. of Germany

[73] Assignee: Ford Motor Company, Dearborn, Mich.

[21] Appl. No.: 549,132

[22] Filed: Nov. 7, 1983

[30] Foreign Application Priority Data

Nov. 15, 1982 [DE] Fed. Rep. of Germany ....... 3242245

[51] Int. Cl.³ .............................................. F21V 3/18
[52] U.S. Cl. ........................................ 362/66; 362/80;
362/238; 362/428; 362/83; 362/287; 362/429;
362/228; 362/297; 362/310; 362/323; 362/368;
362/372
[58] Field of Search ....................... 362/61, 64, 66, 80,
362/83, 228, 236, 238, 240, 368, 382, 428, 429,
430, 250, 287, 297, 310, 323, 372

[56] References Cited

U.S. PATENT DOCUMENTS

| | | | |
|---|---|---|---|
| 3,949,215 | 4/1976 | Whitney | 362/80 X |
| 4,196,459 | 4/1980 | Dick | 362/80 X |
| 4,264,944 | 4/1981 | Deyerrewaere | 362/61 |
| 4,306,276 | 12/1981 | Dick | 362/66 |

FOREIGN PATENT DOCUMENTS

| | | | |
|---|---|---|---|
| 2656755 | 6/1978 | Fed. Rep. of Germany | 362/61 |
| 1958761 | 11/1978 | Fed. Rep. of Germany | 362/61 |
| 2035533 | 6/1980 | United Kingdom | 362/61 |
| 2108256 | 5/1983 | United Kingdom | 362/61 |

Primary Examiner—Peter A. Nelson
Attorney, Agent, or Firm—Clifford L. Sadler; Daniel M. Stock

[57] ABSTRACT

The invention relates to an indicator lamp and headlamp mounting for a vehicle in which the indicator lamp 1 and the headlamp 2 are mounted on opposite sides of a web 21 separating two bodywork sections by means of an alignment component 8. The headlamp is secured to the bodywork by at least two further mountings 10,11.

The alignment component includes an adjustable spacing stop screw 15 which ensures a preset spacing between the indicator lamp 1 and headlamp unit 2 and alignment pins 7 are formed on the indicator lamp 1, which pins 7 project through apertures in the web 16 into holes 19 in a headlamp holding plate 20 securable to the web 16 by means of screws. The holding plate 20 has means for enabling the headlamp to be aligned both vertically and horizontally with the indicator lamp.

7 Claims, 3 Drawing Figures

INDICATOR LAMP AND HEADLAMP MOUNTING TO VEHICLE BODYWORKS

The invention relates to an indicator lamp and headlamp mounting for a vehicle in which the indicator lamp and the headlamp are mounted on opposite sides of a web separating two bodywork sections by means of an alignment component, the headlamp being secured to the bodywork by at least two further mountings.

German Patent Specification No. 28 47 908 discloses an indicator lamp and headlamp mounting for a vehicle in which the mounting and aligning component is used directly for the mounting of the indicator lamp and is directly aligned for the mounting of the headlamp unit.

In this known arrangement correct alignment of the indicator lamp and the headlamp unit with respect to one another was ensured, but the headlamp adjustment and/or mounting mechanism had to be detached if it was necessary to dismantle the indicator lamp in order to replace, for example the indicator lamp.

The present invention seeks to provide an improved indicator lamp and headlamp mounting for a vehicle such that while a simple alignment of the indicator lamp and the headlamp is ensured, possible independent dismantling of the indicator lamp and the headlamp unit is also allowed.

In accordance with the present invention, there is provided an indicator lamp and headlamp mounting for a vehicle in which the indicator lamp and the headlamp are mounted on opposite sides of a web separating two bodywork sections by means of an alignment component, the headlamp being secured to the bodywork by at least two further mountings, wherein the alignment component includes an adjustable spacing stop screw which ensures a preset spacing between the indicator lamp and headlamp unit and in which alignment pins are formed on the indicator lamp, which pins project through apertures in the web into holes in a headlamp holding plate securable to the web, the holding plate having means for enabling the headlamp to be aligned both vertically and horizontally with the indicator lamp.

In one embodiment of the invention, the spacing stop screw is screwed into the web plate, the means for enabling alignment of the headlamp comprise shoulders on the holding plate cooperating with upper and lower guide edges of the housing of the headlamp unit, the side of the headlamp unit remote froom the holding plate is supported by a V-shaped spring retainer which maintains the headlamp unit in contact with the spacing stop screw and secures the headlamp vertically, and the headlamp unit is secured to a part of the bodywork via a flange secured by screws to the headlamp unit and the bodywork.

Preferably, the holding plate comprises an aperture with an abutment edge on which the headlamp unit is aligned by a stop pin projecting from the headlamp unit.

Figure 2:
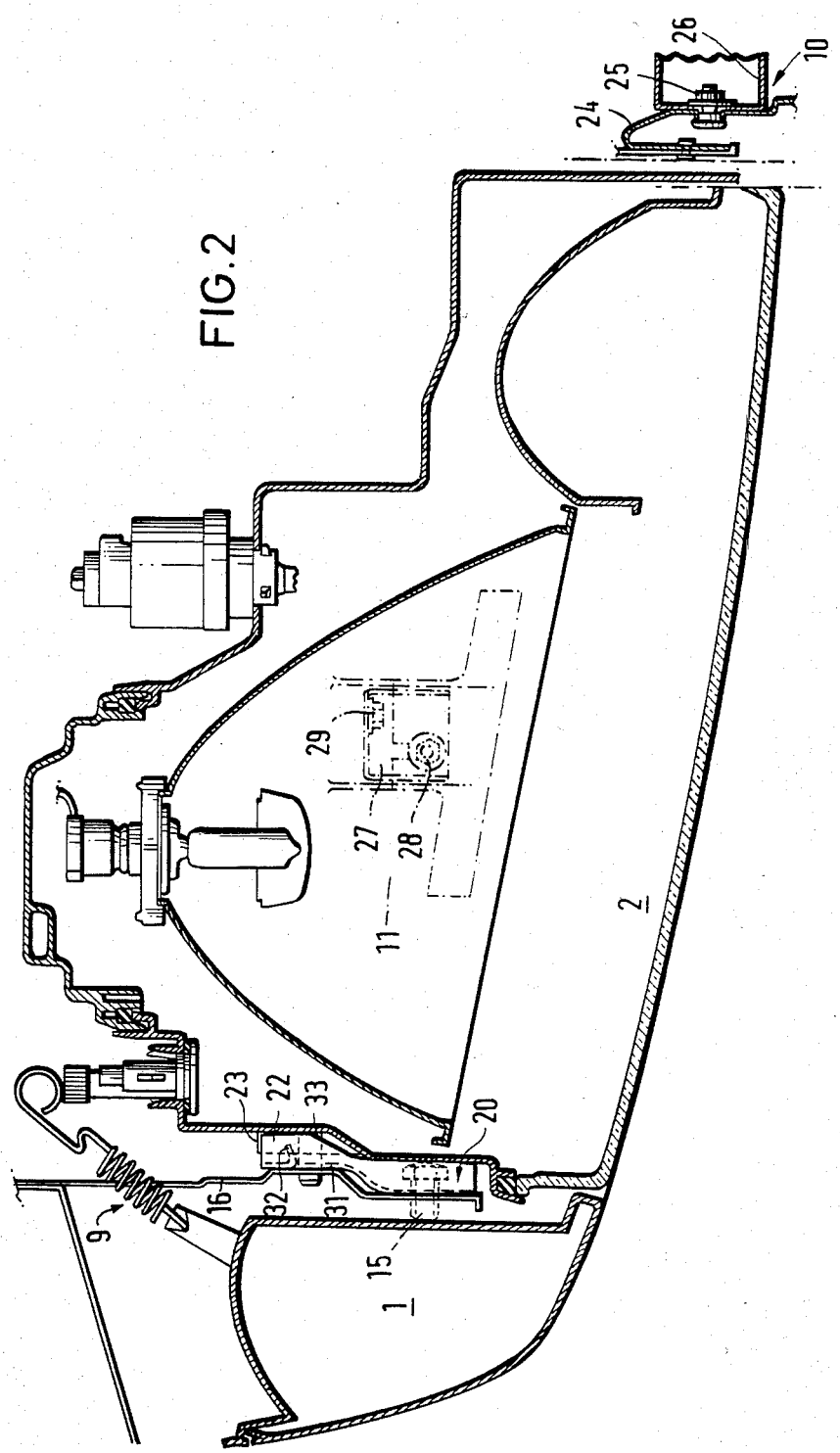
Figure 3:
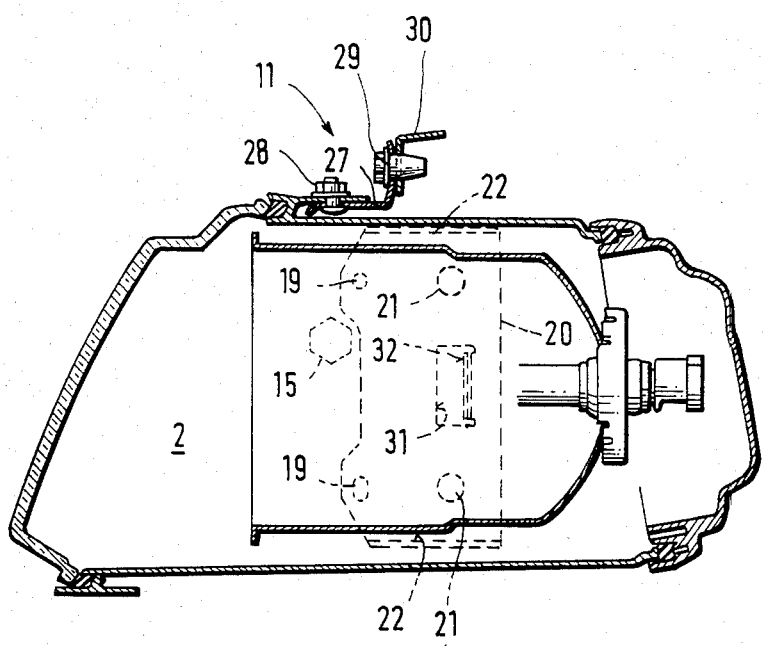

The invention will now be described further, by way of example, with reference to the accompanying drawings, in which:

FIG. 1 is a front view of an indicator lamp and headlamp arrangement with the adjacent bodywork areas shown in dot-dash lines and cut away in the area of the mountings, FIG. 2 is a horizontal section along the line II—II of FIG. 1, and FIG. 3 is a section along the line III—III of FIG. 1.

In FIG. 1, an indicator lamp 1 is disposed adjacent a headlamp unit. The indicator lamp 1 is disposed at the front end 3 of a front bender 4 while the headlamp unit 2 is fitted at the front end of the engine compartment 6 and aligned with its contour 5. A bumper 7 is disposed below the indicator lamp 1 and the headlamp unit 2.

It can be seen from FIG. 1 that the adjacent sides of the indicator lamp 1 and the headlamp unit 2 are positioned by means of a common alignment component generally designated 8. The indicator lamp 1 is secured via a further mounting 9 (see FIG. 2) to the front fender 4 while the headlamp unit 2 is secured to the bodywork by two futher mountings 10 and 11.

The indicator lamp 1 is supported by outer stops 13 and 14 on the front fender 4 and by an inner stop in the form of an adjustable stop screw 15 of predetermined length which is screwed into a self-locking thread in a bodywork web 16 separating the engine compartment from the front fender 4. The mounting 9 of the indicator lamp 1 is formed as a tension spring mounting, which is known per se, and which ensures reliable contacting of the indicator lamp 1 with its stops 13, 14 and 15.

Alignment pins 17 are disposed on the indicator lamp 1, which pins 17 extend through apertures 18 in the web 16 and into holes 19 in a headlamp holding plate 20 which may be fixed to the web plate 16 by screws 21. The holding plate 20 comprises upper and lower guide edges 22 which are arranged on one side of the headlamp unit 2.

On the other side of the headlamp unit 2, the mounting 10 is formed by a V-shaped spring retainer 24 which may be secured to a part 26 of the bodywork by a screw connection 25.

The third mounting 11 of the headlamp unit 2 is formed by a flange 27 which permits taking up of tolerances and which is secured to the headlamp unit 2 by a screw connection 28 and to a portion 30 of the bodywork by a screw connection 29.

The holding plate 20 is further provided with an aperture 31 and an offset abutment edge 32 which receives a stop pin 33 disposed on the headlamp unit 2. In this way, the headlamp unit 2 may also be aligned in the longitudinal direction of the vehicle.

Shoulders are provided on the guide edges 23 of the headlamp unit 2, which, in combination with the V-shaped retainer 24, act to allow the headlamp unit 2 to be horizontally aligned with respect to the outline of the front end of the engine compartment 6.

To assemble the indicator lamp 1 and the headlamp unit 2, the stop screw 15 is first screwed into the corresponding threaded aperture formed in the web 16 and the indicator lamp 2 is disposed thereupon in the front fender 4 by means of its mounting 9. Alignment of the indicator lamp 2 with respect to the front fender 4 may be corrected if necessary by adjustment of the stop screw 15.

The headlamp holding plate 20 is then positioned by means of its apertures 19 on the pins 17 of the indicator lamp 2 and the holding plate 20 is secured rigidly to the web 16 by means of screws 21. It should be noted that the holes 19 are formed differently in order to prevent jamming as a result of tolerances when the holding plate 20 is oriented.

Next, the guide edges 23 of the headlamp unit 2 are slipped over the shoulders 22 of the holding plate 20 until the mounting 10 in the form of a V-shaped spring retainer 24 provided on the other side of the headlamp unit 2 is disposed over the bodywork part 26. In this way, the headlamp unit 2 is maintained in contact with the head of the stop screw 15 and the correct spacing with respect to the adjacent indicator lamp is therefore ensured. The headlamp unit 2 is thus aligned in the vertical direction so that its contour conforms with the outline of the engine compartment 6. The screw mounting 25 of the spring retainer 24 is then tightened and the mounting 10 is secured in this way.

With the headlamp unit 2 correctly aligned and secured to the indicator lamp 1, the flange 27 is rigidly secured as an additional mounting to the headlamp unit 2 by the screw connection 28 and to a portion of the bodywork by the screw connection 29. The screw connections and the aperture arrangements in the area of the angle plate 27 are selected such that all tolerances arising may be compensated and a tension-free mounting of the aligned headlamp unit 2 is assured.

In the case of an arrangement comprising an indicator lamp and a so-called semi-sealed-beam headlamp unit it is also possible to use the headlamp holding plate of the invention. The spacing stop screw 15 may in this case be directly screwed into the headlamp holding plate when for example an indicator lamp is secured to the bodywork section by an adequate three-point support. Furthermore, the holding plates may be formed as integrated complementary pivoting parts, such as, for example, a ball cup or ball pin, for the pivotably movable fixed point of the headlamp unit and the other side of the headlamp unit may be secured to the bodywork by alternative adjustment devices which are known per se.

We claim:

1. An indicator lamp and headlamp mounting for a vehicle in which the indicator lamp and the headlamp are mounted on opposite sides of a web separating two bodywork sections by means of an alignment component, the headlamp being secured to the bodywork by at least two further mountings, wherein the alignment component includes an adjustable spacing stop screw which ensures a preset spacing between the indicator lamp and the headlamp unit and in which alignment pins are formed on the indicator lamp, which pins project through apertures in the web into holes in a headlamp holding plate securable to the web, the holding plate having means for enabling the headlamp to be aligned both vertically and horizontally with the indicator lamp.

2. An indicator lamp and headlamp mounting as claimed in claim 1, wherein the spacing stop screw is screwed into the web plate, the means for enabling alignment of the headlamp comprise shoulders on the holding plate cooperating with upper and lower guide edges of the housing of the headlamp unit, the side of the headlamp unit remote from the holding plate is supported by a V-shaped spring retainer which maintains the headlamp unit in contact with the spacing stop screw and secures the headlamp vertically, and the headlamp unit is further secured to a part of the bodywork via a flange secured by screws to headlamp unit and the bodywork.

3. An indicator lamp and headlamp mounting as claimed in claim 2, wherein the holding plate comprises an aperture with an abutment edge on which the headlamp unit is aligned by means of a stop pin projecting from the headlamp unit.

4. An indicator lamp and headlamp mounting as claimed in claim 2, wherein shoulders are provided on the guide edges on the headlamp unit which shoulders act in conjunction with vertically displaceable screw connections to enable horizontal alignment of the headlamp unit with respect to the outline of the front end of the engine compartment.

5. An indicator lamp and headlamp mounting as claimed in claim 1, wherein the headlamp unit is a semi-sealed-beam unit, the spacing stop screw is screwed into the headlamp holding plate and the alignment means are formed as complementary pivoting parts integrated on the spacing stop screw for the pivotably movable fixed point on the headlamp unit, the other side of the headlamp unit being secured to the bodywork by suitable adjustment devices.

6. An indicator lamp and headlamp mounting as claimed in claim 3, wherein shoulders are provided on the guide edges on the headlamp unit which shoulders act in conjunction with vertically displaceable screw connections to enable horizontal alignment of the headlamp unit with respect to the outline of the front end of the engine compartment.

7. An indicator lamp and headlamp mounting for mounting an indicator lamp and a headlamp in the bodywork of a motor vehicle, the mounting comprising:

a web separating two bodywork sections into which the indicator lamp and headlamp are separately mounted, the web having apertures formed through it;

an alignment component operatively carried with the web and including an adjustable spacing stop screw for engaging portions of the indicator lamp and the headlamp for ensuring a preset spacing therebetween, alignment pins formed on the indicator lamp and projecting through the web apertures and a headlamp holding plate securable to the web and including means for enabling the headlamp to be vertically and horizontally aligned with the indicator lamp; and at least two further mountings for securing the headlamp to the vehicle bodywork.

* * * * *